(12) United States Patent
Wyatt

(10) Patent No.: US 6,727,912 B1
(45) Date of Patent: Apr. 27, 2004

(54) METHODS AND APPARATUS FOR VIEWING VARIABLE RESOLUTION INFORMATION ON A DISPLAY

(75) Inventor: Ivan S. Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 340 days.

(21) Appl. No.: 09/617,756

(22) Filed: Jul. 17, 2000

(51) Int. Cl.[7] .......................... G09G 5/00; G01C 23/00; G08B 23/00
(52) U.S. Cl. .................. 345/660; 340/973; 340/967
(58) Field of Search .................. 345/27, 25, 666, 345/667, 618; 340/973, 425.5, 441, 450, 449, 451, 438, 439

(56) References Cited

U.S. PATENT DOCUMENTS

| | | | |
|---|---|---|---|
| 4,149,148 A | | 4/1979 | Miller et al. |
| 4,479,784 A | | 10/1984 | Mallinson |
| 4,520,506 A | * | 5/1985 | Chan et al. .................. 382/242 |
| 4,862,149 A | * | 8/1989 | Boyer ......................... 340/635 |
| 5,242,306 A | | 9/1993 | Fisher |
| 5,250,947 A | * | 10/1993 | Worden et al. ............. 340/973 |
| 5,412,382 A | * | 5/1995 | Leard et al. ................. 340/974 |
| 5,745,863 A | | 4/1998 | Uhlenhop |
| 5,936,552 A | * | 8/1999 | Wichgers et al. ........... 340/963 |
| 6,057,786 A | * | 5/2000 | Briffe et al. ................. 340/975 |
| 6,112,141 A | * | 8/2000 | Briffe et al. .................. 701/14 |
| 6,121,899 A | * | 9/2000 | Theriault .................... 340/967 |
| 6,262,674 B1 | * | 7/2001 | Wyatt ......................... 340/975 |

FOREIGN PATENT DOCUMENTS

| | | |
|---|---|---|
| EP | 0702331 A | 3/1996 |
| EP | 0773515 A | 5/1997 |

* cited by examiner

*Primary Examiner*—Matthew C. Bella
*Assistant Examiner*—Anthony J Blackman

(57) ABSTRACT

The present invention includes a display for viewing information, where a number of lines on the display has a variable line resolution scale. Each of the number of lines corresponds to a value of information, such as angle degrees relative to the horizon line of the sky in the context of avionics, for example. In addition, the present invention may include a value indicator positioned within the number of lines on the display such that the value indicator designates a value of information. Each distance between each of the number of lines may vary, so that the line resolution of the number of lines near the value indicator, for example, is greater than the line resolution further removed from the value indicator. By varying the line resolution using a distortion function, values of information on the display may be more precisely read.

16 Claims, 9 Drawing Sheets

(PIECE-WISE LINEAR)

(SINUSOIDAL)

(EXPONENTIAL)

METHODS AND APPARATUS FOR VIEWING VARIABLE RESOLUTION INFORMATION ON A DISPLAY

BACKGROUND OF THE INVENTION

The present invention generally relates to a display for viewing information and methods for its use. More particularly, the present invention relates to a display having a variable line resolution scale and methods for its use.

BRIEF DESCRIPTION OF THE DRAWING FIGURES

The subject invention will hereinafter be described in the context of the appended drawing figures, wherein like numerals denote like elements, and:

DETAILED DESCRIPTION

Figure 1:
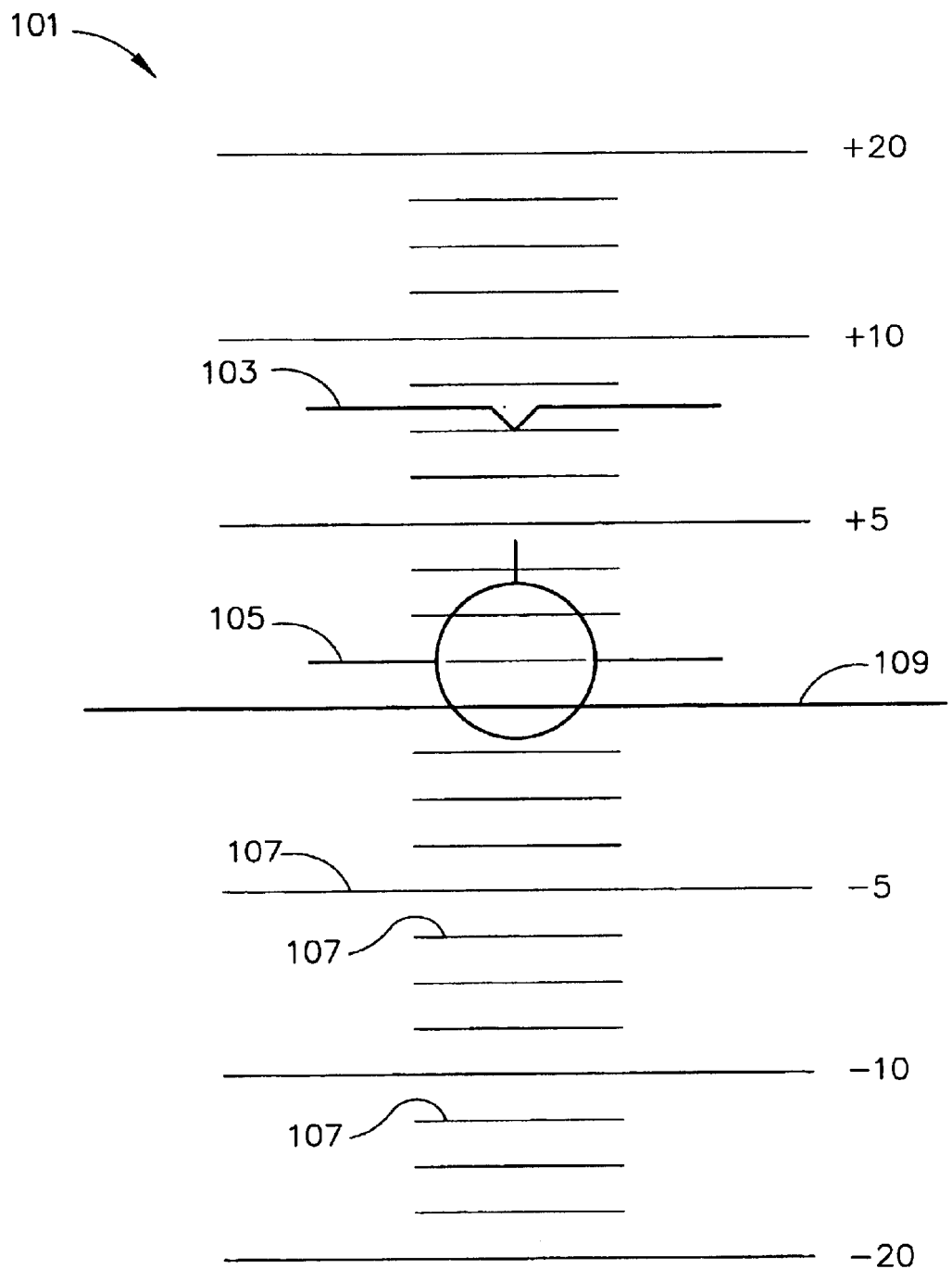
FIG. 1 illustrates a prior art display device.

Displays present information to a viewer in many different formats. Oftentimes, displays are used in avionics, transportation, or communications, for example, as a means of presenting the information to a viewer. It is desirable to have the information presented in an easily viewable and organized manner. FIG. 1 illustrates a Heads-Down Display (HDD) 101 used in avionics for displaying flight information. HDD 101 communicates various flight information to a viewer, such as a pilot. For example, HDD 101 may include a number of lines 107 such that each line represents a value of information, for example degrees above or below the horizon line. Various embodiments of HDD 101 also include a pitch indicator 103 representing the direction the airplane is pointing, a flight path marker 105 representing the direction of travel of the airplane, and horizon line 109 representing the horizon line in the sky. In the example shown in FIG. 1, pitch indicator 103 indicates a value of about 7 degrees upward, and flight path marker 105 indicates a direction of travel above the horizon line. HDD 101 permits a pilot to view multiple forms of information at a glance. Although HDD 101 presents viewable information, however, it does not adequately provide precise flight parameter readings such that it is often difficult to determine the precise pitch of an aircraft, for example.

Figure 9:
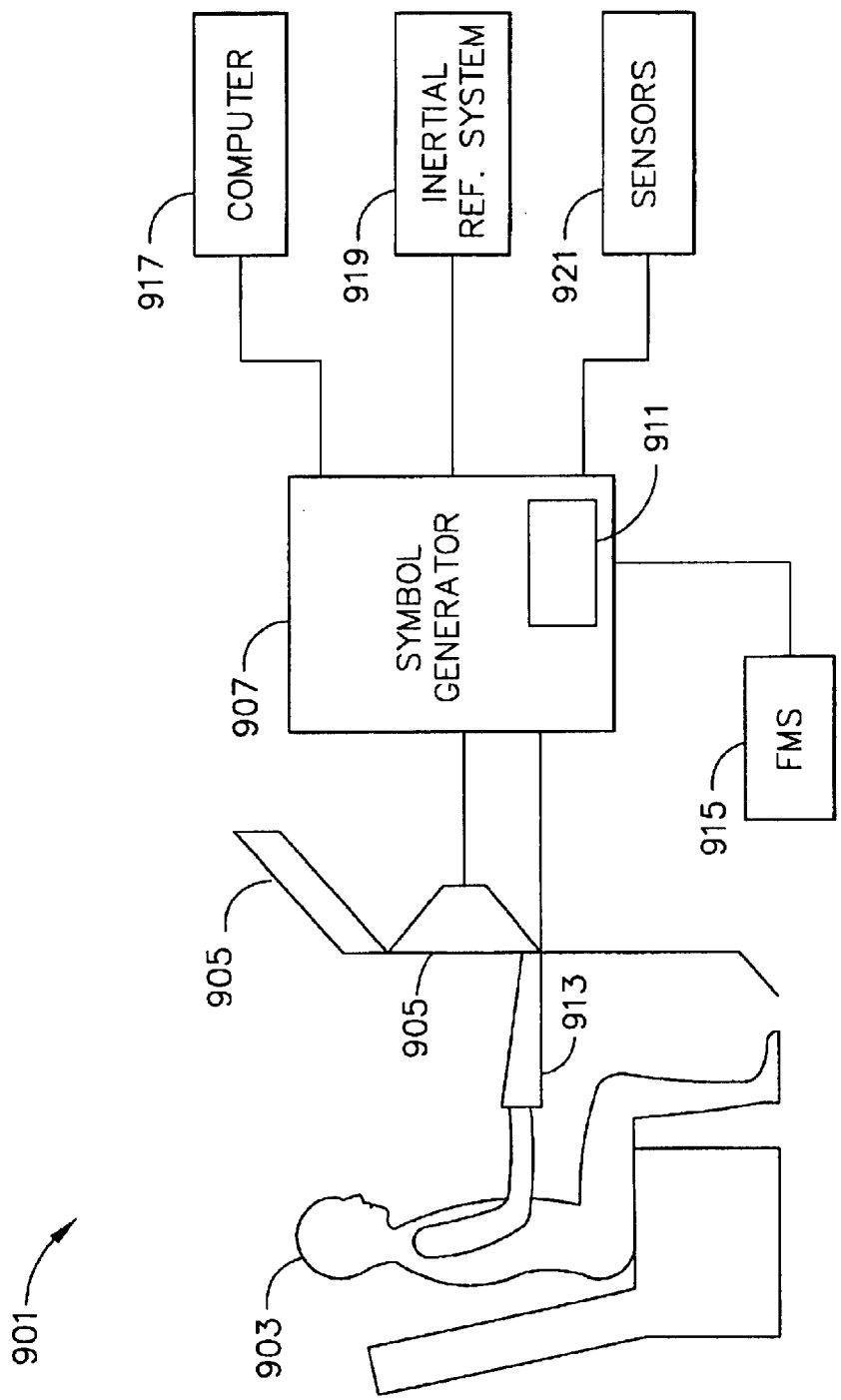
FIG. 9 illustrates a system for providing data to a user.

Referring now to FIG. 9, a system 901 for providing data to a user 903 includes at least one display 905 and a symbol generator 907 having a processor 911. Symbol generator 907 generates images on display 905 so that information may be provided to user 903. In various embodiments, symbol generator 907 receives data from controls 913, a Flight Management System (FMS) 915, a navigation computer 917, inertial reference systems 919, sensors 921, and/or the like, such that the images displayed on display 905 provide accurate feedback to user 903. For example, if user 903 is a pilot, then accurate aircraft performance data may be provided to the pilot.

High resolution of data is greatly desired, since high resolution corresponds to increased accuracy and precision in displaying data. One way to increase resolution of data is to increase the size of the scale presented on the display. Of course, increasing the size of the scale is typically limited by the size of the display, so it may not always be practical. Moreover, increasing the size of the scale may result in a decreased field of view; that is, increasing the size of the scale generally provides a more precise view of a smaller portion of the entire scale, so that some information may be missing. Nevertheless, it will be appreciated that increasing the distances between the number of lines on the scale will result in improved resolution of the data that the lines represent, as discussed below.

Figure 2:
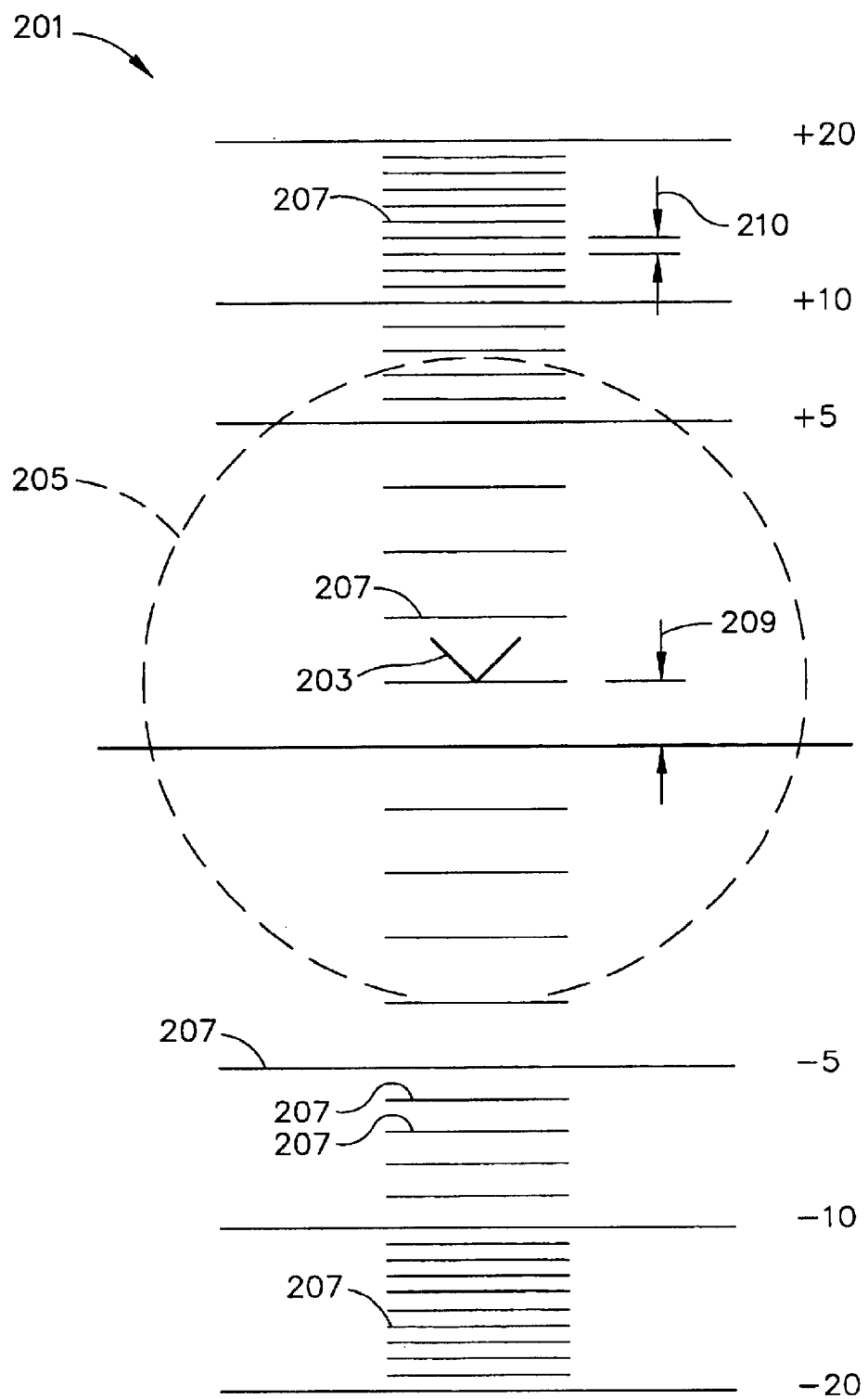
FIG. 2 illustrates a display in accordance with an exemplary embodiment of the present invention.

Referring now to FIG. 2, a display 201 illustrates an exemplary embodiment of the present invention. Display 201 includes a number of lines 207 such that each line represents a value of information, such as pitch angle in degrees. Of course, display 201 may represent any type of information in that each line corresponds to a value of that information, so that a scale having number of lines 207 may be displayed. Number of lines 207 may be one or more lines, such as a plurality of lines. Display 201 also includes an optional value indicator 203 pointing to a value within number of lines 207 in order to indicate a particular reading or an indicated value of information to a viewer. In this respect, it is desirable to have an accurate and easily readable display.

A processor (not shown) operatively coupled to display 201 may generate images on display 201, and includes hardware and/or software for calculating information to be displayed on display 201. For example, the hardware and/or software for calculating information may include a symbol generator, such as a Honeywell PRIMUS EPIC, EPIGCDS-R, or any other suitable symbol generator display driver, FMS, computer, or the like. The images on display 201 may have a line resolution of number of lines 207, where the line resolution is dependent on the amount of spacing between each of number of lines 207. Accordingly, the line resolution of number of lines 207 defines how easily and accurately information is presented to a viewer. The line resolution depends on the various distances between number of lines 207. Each of number of lines 207 are separated by a distance 209, a distance 210, and so on, where distances 209 and 210 may vary between each of number of lines 207. Distances 209, 210, and so on include constant or varying distances between number of lines 207 having one or more varying magnitudes across the scale. For example, distance 209 near value indicator 203 may be different from distance 210 further removed from value indicator 203. The processor may compute the magnitudes of distances 209 and 210 such that the line resolution of the scale is increased near value indicator 203, for example. A greater line resolution includes larger distances between number of lines 207, whereas, a smaller line resolution includes shorter distances between number of lines 207. Of course, number of lines 207 may have any number of distances between number of lines 207, and is in no way limited to distances 209 and 210 as illustrated.

An area of interest 205 surrounding value indicator 203 illustrates one area of display 201 that a viewer may desire to pay particular attention to. Of course, area of interest 205 may be a local distance (e.g., a local radial distance) from the location of value indicator 203, a rectangular distance around value indicator 203, or any other distance relative to value indicator 203. Area of interest 205 need not be relative to value indicator 203, of course, it may be any area on display 201 that a viewer desires to view with accuracy. For example, the line resolution near value indicator 203 may be greater than the line resolution further removed from value indicator 203. That is, the lines may be further apart inside area of interest 205 and closer together outside area of interest 205, as illustrated in FIG. 2. In such a manner, the resolution of display 201 within area of interest 205 may be greater than the resolution outside area of interest 205. In this way, the line resolution near value indicator 203 may include the area illustrated by area of interest 205, for example. In such an exemplary embodiment of the present invention, distance 209 located within area of interest 205 (and having a first magnitude) is greater than distance 210 located outside area of interest 205 (and having a second magnitude). As such, if the viewer is particularly interested in viewing the information in area of interest 205, the greater distance 209 between each of number of lines 207 allows the viewer to more accurately and more easily view such information. By way of illustration, number of lines 207 may represent angle degrees relative to the horizon line of the sky as in the example in FIG. 1. In such an illustration, a pilot may more accurately read value indicator 203 to have a value of 1 degree upward, because the resolution near value indicator 203 is greater inside area of interest 205 than outside area of interest 205. Thus, varying the line resolution of number of lines 207 on display 201 provides a more accurate and easily readable display.

However, the viewer may not be able to view the information as easily outside area of interest 205, because the line resolution is less outside area of interest 205 in this example. As such, area of interest 205 may be repositioned in order to view other information on display 201 more accurately. By way of illustration and in the context of avionics, area of interest 205 may be a function of an aircraft's position, velocity, speed, angle and/or other parameters. As such, if the aircraft changes position, velocity, speed, or another parameter, then area of interest 205 suitably scrolls or otherwise changes to accommodate the changing conditions. When area of interest 205 is repositioned, the line resolution will be adjusted in order to reflect the new area of interest 205. In this way, the center of the variation of the line resolution changes corresponding to a change or repositioning of area of interest 205. The center of the variation of the line resolution includes a central location on the scale of number of lines 207 where distance 209 and/or distance 210 can be expanded or increased as desired.

In order to vary the line resolution of number of lines 207, a distortion function in the symbol generator may be used. A distortion function varies distance 209 and/or distance 210 between each of number of lines 207 using one or more algorithms including piecewise linear, exponential, and/or continuous. Of course, each distance 209 and/or distance 210 may be constant or variable between each of number of lines 207 such that one or more of each distance 209 and/or distance 210 may be the same or different between number of lines 207. Of course, number of lines 207 may have more constant and/or varying distances (other than distance 209 and/or distance 210) between number of lines 207.

Figure 3:
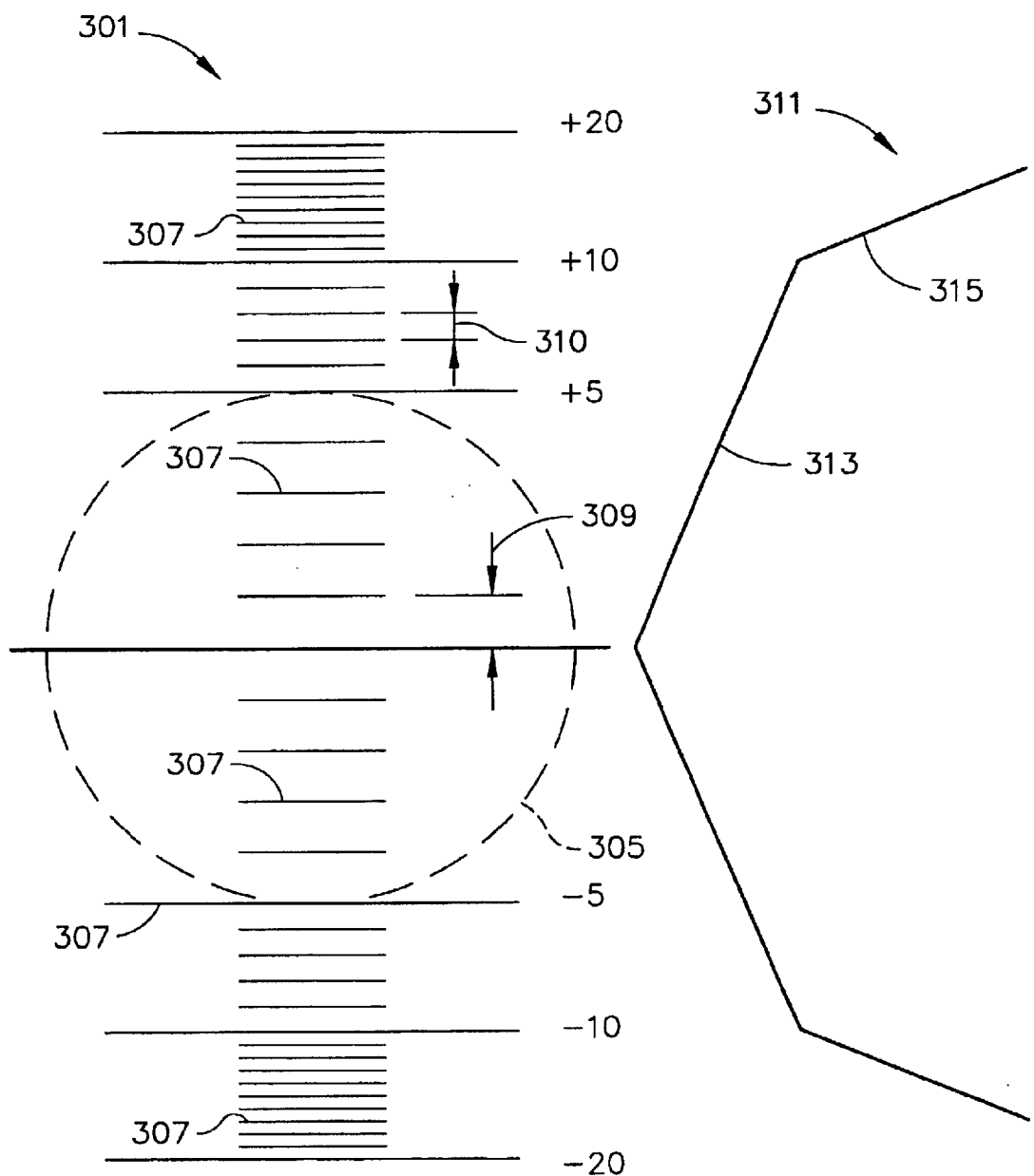
FIG. 3 illustrates a display having a variable line resolution of a number of lines using a piecewise linear distortion algorithm in accordance with an exemplary embodiment of the present invention.

FIG. 3 illustrates display 301 having a variable line resolution of a number of lines 307 using a piecewise linear distortion algorithm in accordance with an exemplary embodiment of the present invention. The piecewise linear distortion algorithm may be used to vary one or more of each distance 309 and/or distance 310 between number of lines 307 in order to have a variable line resolution of number of lines 307 on display 301. Of course, number of lines 307 may be any number of lines, and thus there may be any number of distances between the any number of lines. In this manner, distances 309 and 310 represent one or more distances each between number of lines 307. Of course, number of lines 307 may have any number of distances between number of lines 307, and is in no way limited to distances 309 and 310 as illustrated. For example, each distance 309 within an area of interest may exhibit a magnitude that is a function of a first piecewise linear algorithm, and each distance 310 outside of the area of interest may exhibit a magnitude that is a function of a second piecewise linear algorithm. Of course, other distances between number of lines 307 may further vary to include a third piecewise linear algorithm, a fourth piecewise linear algorithm, and so on. Accordingly, a curve 311 demonstrates the variation in the slope of one or more lines in accordance with using a piecewise linear distortion algorithm, such as first line 313 having a first slope and second line 315 having a second slope. As discussed below, curve 311 may vary distance 309 between each of number of lines 307 according to the first slope for a first interval (for example, in area of interest 305). Additionally, curve 311 may further vary distance 310 according to the second slope for a second interval (for example, outside area of interest 305). Of course, number of lines 307 may be divided into as many intervals as desired, and curve 311 may have one or more lines having one or more slopes to vary the line resolution of number of lines 307 as desired.

Figure 4:
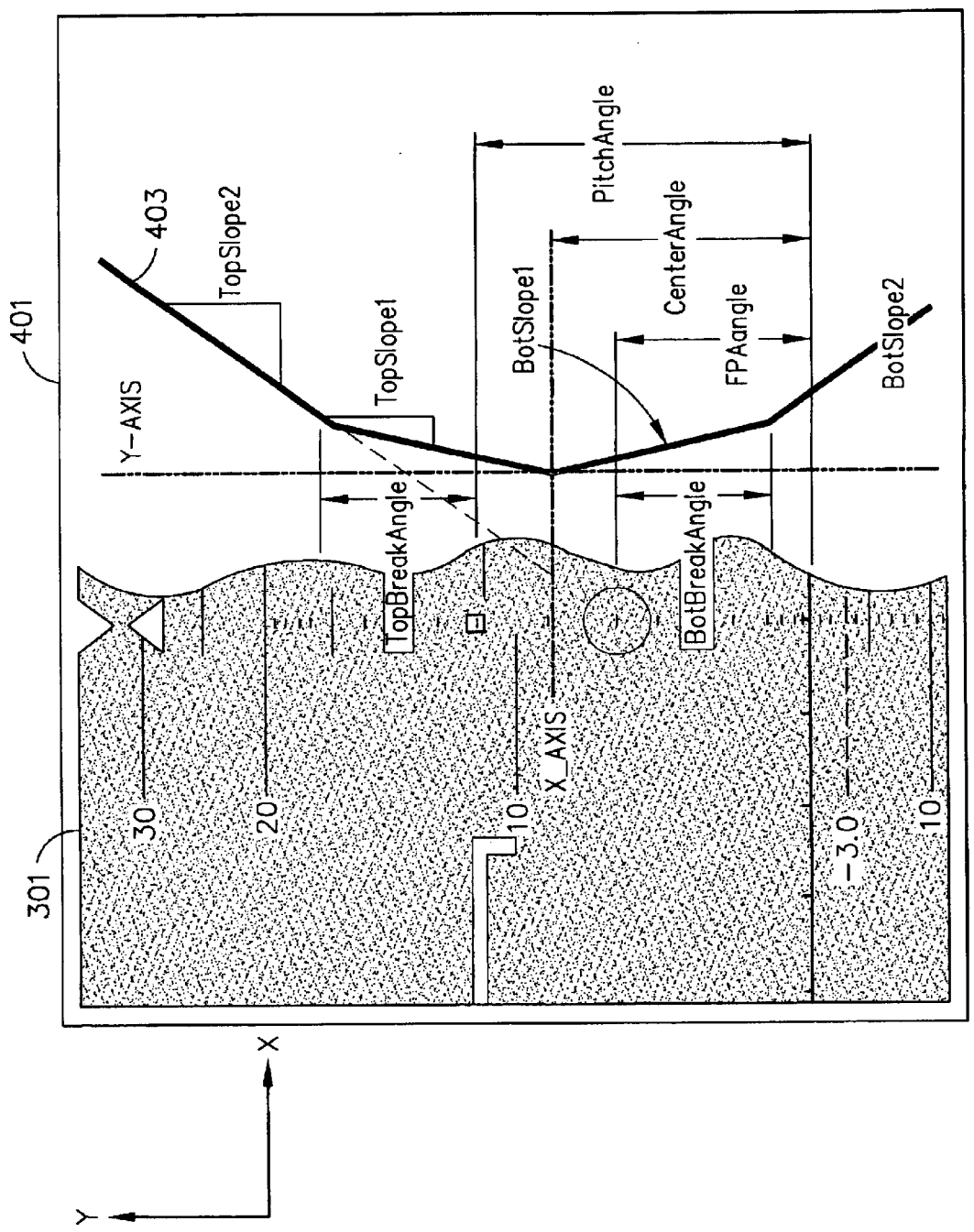
FIG. 4 illustrates a graphical diagram of a display along side a piecewise linear distortion algorithm graph in accordance with an exemplary embodiment of the present invention.
Figure 5:
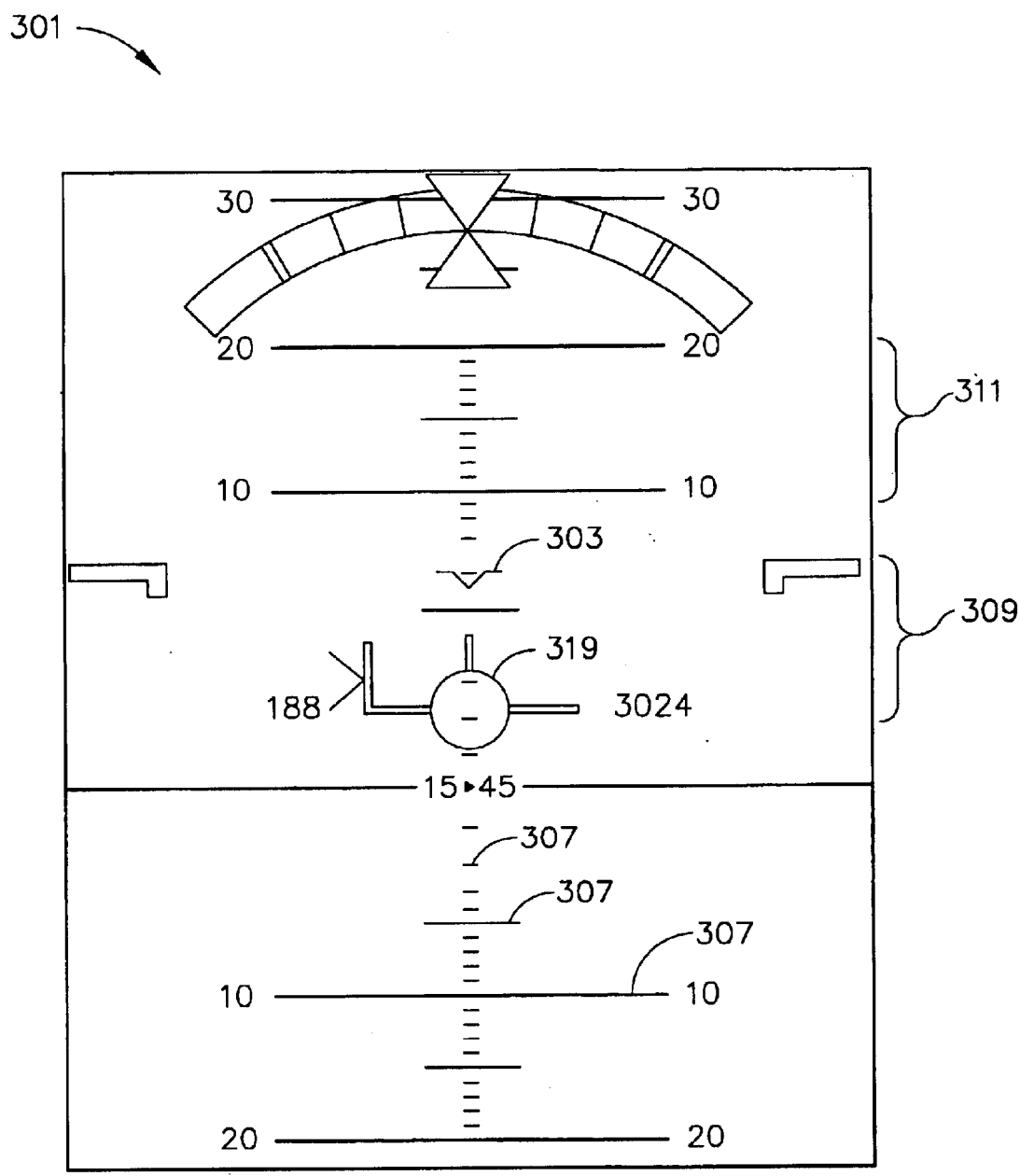
FIG. 5 illustrates a piece-wise linear compression value of a number of lines across a display, where the compression value varies from about 3 near a value indicator to about 9 further removed from the value indicator in accordance with an exemplary embodiment of the present invention.

In order to illustrate one method of using the piecewise linear distortion algorithm to vary each distance 309, FIG. 4 illustrates a graphical diagram of display 301 along side a piecewise linear distortion algorithm graph 401 for varying distances 309 and 310. Graph 401 displays a curve 403 having a Y-axis corresponding to the values of information in connection with number of lines 307, and an X-axis that may correspond to a second dimension of number of lines 307. Curve 403 includes several parameters defining an exemplary piecewise linear distortion algorithm. Curve 403 has a first slope (TopSlope1) and a second slope (TopSlope2), where each slope is associated with a compression value of distances 309 and 310. In avionics, for example, the compression value of the distances between number of lines 307 may be calculated by the angle represented on display 301 divided by the angle subtended by that representation of the angle at the pilot's eye. By way of illustration and in the context of avionics, if forty-five (45) degrees are represented on display 301, the representation of 45 degrees at the pilot's eye is subtended one (1) degree, the height of display 301 is 3.25 inches, and display 301 is approximately thirty-two (32) inches from the pilot's eye, then the compression value of distance 309 will be about 7.74 (which is (45 degrees/2)/(arctan[(3.25 inches/2)/32 inches]). In addition, another compression value of distance 309 may be 3.0, for example, such that the line resolution of number of lines 307 at the 3.0 compression value will be greater than the line resolution of number of lines 307 at the 7.74 compression value (however, the compression is less at the 3.0 compression value and greater at the 7.74 compression value). A similar example is graphically illustrated in FIG. 5, where the piece-wise linear compression value of number of lines 307 across display 301 varies from about 3 (marker 309 near a value indicator 303) to about 9 (marker 311 further removed from value indicator 303) in accordance with an exemplary embodiment of the present invention. Of course, the compression value may be varied as desired, and is not limited to these examples.

In the context of avionics, for example, value indicator 303 may be a pitch indicator and display 301 may further include a flight path marker 319, where flight path marker 319 moves relative to the pitch indicator. Alternatively, the pitch indicator may move relative to flight path marker 319. In this exemplary embodiment, the compression near flight path marker 319 is about 3, which provides for more precise viewing than near marker 311 having a compression of about 9.

Referring again to FIG. 4, curve 403 may have a third slope (BotSlope1) and a fourth slope (BotSlope2), which may be the same as the first and second slopes, respectively, or different. Of course, curve 403 of the piecewise linear distortion algorithm may have one or more slopes that vary as desired. Another parameter of curve 403 is TopBreakAngle, which is the Y-axis value at which there is a change from a first compression value associated with the first slope to a second compression value associated with the second slope. Similarly, BotBreakAngle is the Y-axis value at which there is a change from a third compression value associated with the third slope to a fourth compression value associated with the fourth slope. Of course, TopBreakAngle and BotBreakAngle may be angle degrees, in the context of avionics, for example, or any other values the Y-axis dimension represents. Another parameter of curve 403 is CenterAngle, which is the center of the distortion of curve 403. In the context of avionics, for example, CenterAngle is the midpoint between a pitch indicator and a flight path marker. One or more of these parameters is used in characterizing curve 403 in order to calculate the distances between number of lines 307 as discussed above in accordance with FIG. 3. By way of illustration, Appendix 1 provides sample equations for a piecewise linear distortion algorithm implemented in the C++ programming language using one or more of the parameters described above.

Figure 6:
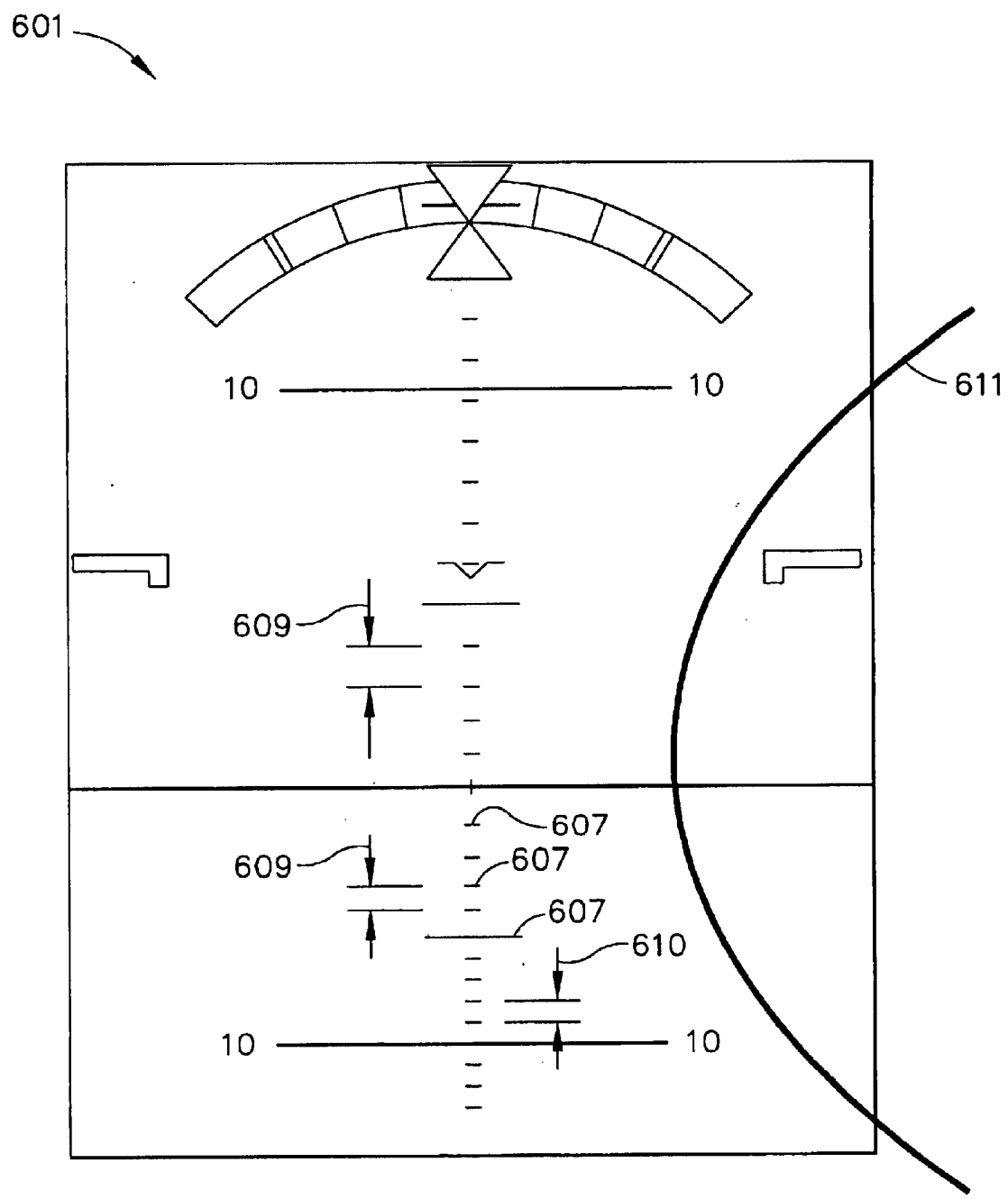
FIG. 6 illustrates a display having a variable line resolution of a number of lines using a continuous distortion algorithm in accordance with an exemplary embodiment of the present invention.

To illustrate another example, FIG. 6 illustrates display 601 having a variable line resolution of a number of lines 607 using a continuous distortion algorithm in accordance with an exemplary embodiment of the present invention. The continuous distortion algorithm is used to vary each distance 609 and/or each distance 610 and so on between each of number of lines 607 in order to have a variable line resolution of number of lines 607 on display 601. A curve 611 demonstrates a continuous distortion algorithm, such as using a sinusoidal, a parabolic, and/or a hyperbolic function in developing the continuous distortion algorithm. As discussed above in connection with the piecewise linear distortion algorithm, curve 611 may vary distance 609 and/or distance 610 and so on between number of lines 607 according to the type of continuous distortion algorithm used. For example, if a sinusoidal function is used to vary distance 609 and/or distance 610, distance 609 and/or distance 610 between each of number of lines 607 would vary continuously throughout number of lines 607, instead of in intervals as discussed above in FIGS. 3, 4, and 5. By way of illustration, Appendix 2 provides sample equations for a sinusoidal distortion algorithm implemented in the C++ programming language using one or more of the parameters described above.

Figure 7:
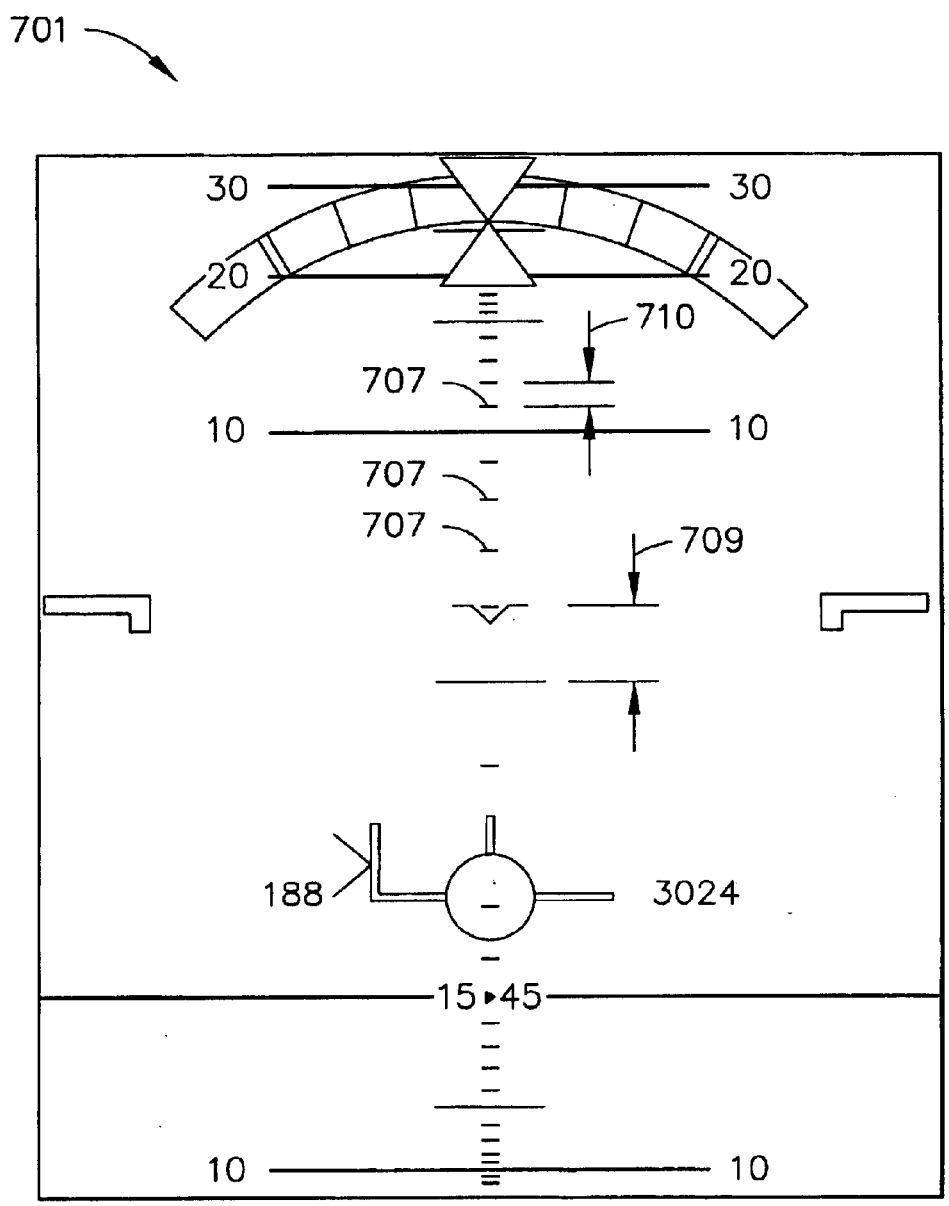
FIG. 7 illustrates a display having a variable line resolution of a number of lines using an exponential distortion algorithm in accordance with an exemplary embodiment of the present invention.

In another example, FIG. 7 illustrates display 701 having a variable line resolution of a number of lines 707 using an exponential distortion algorithm in accordance with an exemplary embodiment of the present invention. The exponential distortion algorithm may be used to vary each distance 709 and/or distance 710 between each of number of lines 707 in order to have a variable line resolution of number of lines 707 on display 701. As discussed above in connection with the piecewise linear distortion algorithm and the continuous distortion algorithm, an exponential curve (not shown) may vary distance 709 and/or distance 710 and so on between number of lines 707 according to the type of exponential distortion algorithm used. For example, if an exponential function is used to vary distance 709 and/or distance 710, distance 709 and/or distance 710 between each of number of lines 707 would vary exponentially throughout number of lines 707, instead of in intervals as discussed above in FIGS. 3, 4, and 5. By way of illustration, Appendix 1 provides sample equations of an exponential distortion algorithm implemented in the C++ programming language using one or more of the parameters described above. As clearly illustrated by FIGS. 5, 6, and 7, distances 309, 310, 609, 610, 709, and 710 vary according to the type of distortion algorithm used to develop each representation of number of lines 307, 607, and 707. Of course, as discussed above, number of lines 307, 607, and 707 may have any number of constant and/or varying distances between each line of number of lines 307, 607, and 707.

Figure 8:
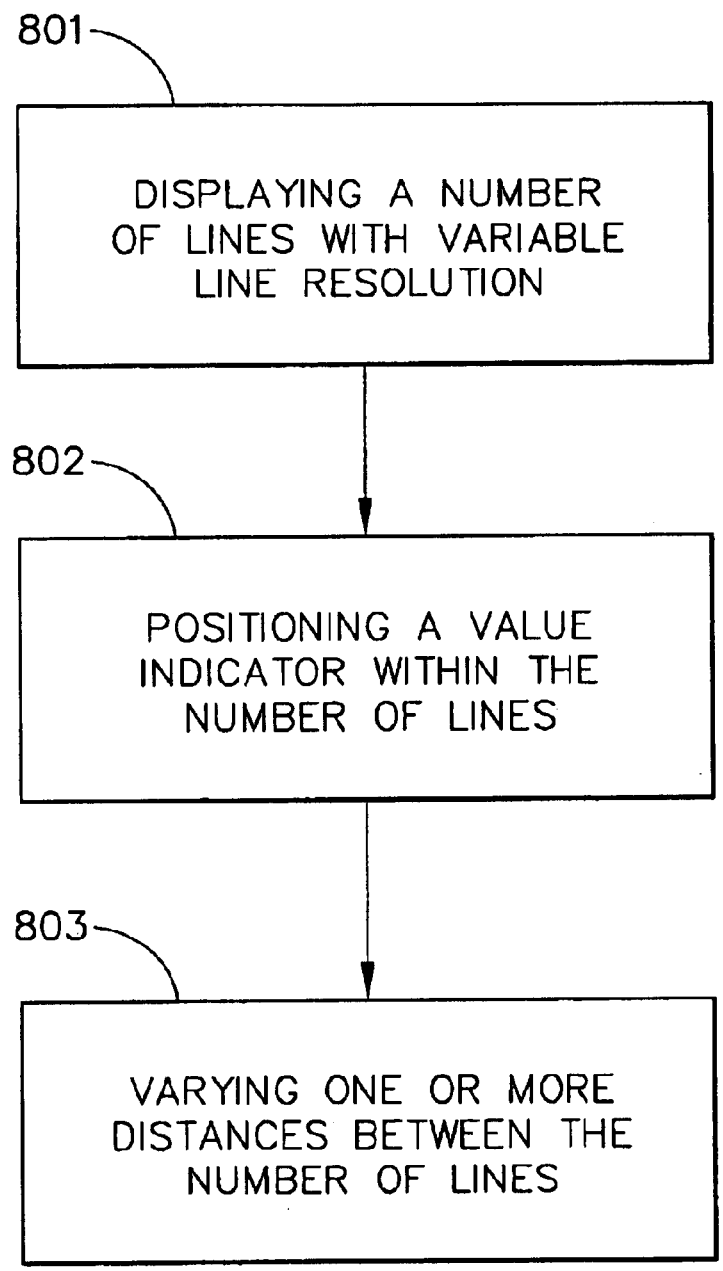
FIG. 8 illustrates a flowchart comprising the steps of an exemplary method for displaying information in accordance with an exemplary embodiment of the present invention.

An exemplary embodiment of the present invention may also be illustrated by the flowchart in FIG. 8, which includes the steps of an exemplary method for displaying information. Step 801 includes displaying a number of lines (e.g., number of lines 207, 307, 607, or 707) on a display (e.g., display 201, 301, 601, or 701), where each line represents a value of information and the number of lines has a variable line resolution. Step 802 includes positioning a value indicator (e.g., value indicator 203 or 303) within the number of lines on the display, wherein the value indicator designates a value of information. Step 802 optionally includes designating an area of interest (e.g., 205 or 305) within the number of lines, where the area of interest includes the location of a value indicator plus a local distance. As discussed above, the area of interest may be a local radial distance from the location of the value indicator, a rectangular distance around the value indicator, or any other distance relative to the value indicator. The area of interest may also be relative to another element of the display, as well.

Step 803 includes varying one or more of the distances between the number of lines on the display. For example, step 803 may include expanding the variable line resolution within the area of interest on the display such that the variable line resolution is greater within the area of interest and less outside the area of interest. In addition, varying the variable line resolution in step 803 may include using at least one of a piecewise linear algorithm, an exponential function, or a continuous compression function. Also, in the context of avionics, for example, step 803 may include displaying information comprising at least one of attitude, air speed, pitch, heading, throttle, fuel, temperature, time, distance, acceleration, or the like, and displaying a flight path marker and a pitch indicator relative to the flight path marker in the area of interest on the display.

Thus, the present invention provides methods and apparatus for viewing information on a display. In an exemplary embodiment of the present invention, one or more distances between the number of lines may vary in order to vary the line resolution on the scale. The distances between the number of lines may be varied using a distortion function, for example. By varying the line resolution, the display may represent information to a viewer in a more precise and organized manner.

Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims. No element described herein is necessary for the practice of the invention, unless the element is expressly described herein as "essential" or "required". Steps recited in any method claims may be executed in any order.

APPENDIX 1

Exponential Compression Function Displayed As Piecewise Linear Slopes
This compression function uses an exponential equation to calculate the various slopes in a piecewise linear display of pitch.
The values of m_fPitchScale, m_fSlopeBot20, m_fSlopeBot10,
m_fSlopeTop10, m_fSlopeTop20, m_fInterceptBot20,
m_fInterceptBot10, m_fInterceptTop10 and
m_fInterceptTop20 are calculated in the InitAlgorithm( ) function and are all constants through a display cycle.

The exponential function is of the form:

$$y = \text{scale}\left(\frac{1}{1 - \text{radius}^{\text{compression}}}\right) \quad \text{Equation 1, Exponential Equation}$$

Where the "radius" and "compression" are constants set to arrive at the desired look and feel of the display. The "scale" is a constant of proportionality.
The PitchAlgorithm( ) function then simply uses the standard point slope form of a line (i.e. y = mx + c) to calculate where to plot a point.

```
float PLLinear::PitchAlgorithm(double an /* radians */){
    an = DEGREES( ( an – m_ffPitchCenteringOffset ) );
    float rtn;
float PLLinear::PitchAlgorithm(double an /* radians */){
    an = DEGREES ( (an - m_ffPitchCenteringOffset));
    float rtn;
    if(an == 0.0)              rtn = 0.0f;
    else if(an < -m_fBreak10 )  rtn = m_fPitchScale*(an * m_fSlopeBot20 + m_fInterceptBot20);
    else if(an < 0 )            rtn = m_fPitchScale*(an * m_fSlopeBot10 + m_fInterceptBot10);
    else if(an < m_fBreak10 )   rtn = m_fPitchScale*(an * m_fSlopeTop10 + m_fInterceptTop10);
    else    rtn = m_fPitchScale*(an * m_fSlopeTop20 + m_fInterceptTop20);
    return rtn;
```

Using the same equation but not using it to calculate a piecewise linear group of equations, the PitchAlgorithm( ) function becomes:

```
float PLExp::PitchAlgorithm(double an /* radians */, BOOL gltranslated){
    //InitAlgorithm( ); //must be called once
    an = DEGREES(an - m_ffPitchCenteringOffset);
    float rtn;
    //determine if angle to in top or bottom //////
    if(an > 0 /*top*/){
        if(an > DEGREES(m_fTopView)) rtn = (m_fTopSlope*an + m_fTopIntercept);
        else rtn = m_fTopRadius*(1-pow((an+1.0), m_fTopComp));
    }
    else if(an < 0 /*bottom*/){
        if(an < DEGREES(-m_fBotView)) rtn = (m_BotSlope*an + m_fBotIntercept);
        else rtn = -m_fBotRadius*(1-pow( (-an+1.0), m_fBotComp));
    }
    else rtn = 0.0f;
    rtn *= m_fPitchScale;
    return gltranslated ? rtn : rtn - m_fPitchTranslation;
}
```

Exponential equation using the "C" power function pow(double,double);

APPENDIX 2

This sample code displays pitch using a sinusoidal compression. The equation is of the form:

y = scale * Sin(c * ω)

or y = Scale * Sin(Compression * InputAngle)

```
//////////////class PLSIN //////////////////////////////////////////////
//////////////class PLSIN //////////////////////////////////////////////
//////////////class PLSIN //////////////////////////////////////////////
/*********************************************************
Sinusoidal to 10 degrees, then linear with slope of function at 10 degrees.
*********************************************************\
void PLSin::InitAlgorithm( ){

// calculate the constants for the next display cycle
// m_fxxxRadius a scaling factor, and
// m_fxxxComp (compression)

}
float PLSin::PitchAlgorithm(double angle /* radians */, BOOL gltranslated ){
    // returns a float value between 0.0 and 1.0.
    // the display function will scale using the display area.
    float rtn;
    angle -= m_ffPitchCenteringOffset;
    if(angle<0){
       if(angle > m_fBotLinAngle) rtn = -m_fBotRadius*sin(m_fBotComp*angle);
         else rtn = -m_fBotRadius*(m_fBotSlope*angle*m_fBotComp +
m_fBotIntercept);
         }
    else  {
    if(angle < m_fTopLinAngle) rtn = m_fTopRadius*sin(m_fTopComp*angle);
         else rtn = m_fTopRadius*(m_fTopSlope*angle*m_fTopComp +
m_fTopIntercept);
         }
       rtn *= m_fPitchScale;
       return gltranslated ? rtn : rtn - m_fPitchTranslation; // return value in
inches
    }
```

> Sinusoidal equation, the xxxRadius values scale the output and the xxxComp values adjust the compression.

What is claimed is:

1. An apparatus for presenting information to a viewer, comprising:
    a display;
    a processor operatively coupled to the display and configured to generate images on the display, the images comprising;
        a scale comprising a plurality of lines separated by a plurality of distances, wherein each of the plurality of lines correlates to the same value of the information; and
        a value indicator positioned on the scale and configured to identify an indicated value of the information of each of the plurality of lines;
        wherein the processor is further configured to compute magnitudes of the plurality of distances such that the resolution of the scale is in increased near the indicated value.

2. The apparatus of claim 1, wherein one or more of the magnitudes of the plurality of distances are different across the scale.

3. The apparatus of claim 1 further comprising an area of interest on the scale, wherein the area of interest is a function of the indicated value and a local radial distance.

4. The apparatus of claim 3, wherein the plurality of distances within the area of interest exhibit a first magnitude and the plurality of distances outside of the area of interest exhibit a second magnitude.

5. The apparatus of claim 3, wherein the first magnitude and the second magnitude are different.

6. The apparatus of claim 3, wherein the plurality of distances within the area of interest exhibit magnitudes that are functions of a first piecewise linear algorithm and wherein the plurality of distances outside of the area of interest exhibit magnitudes that are functions of a second piecewise linear algorithm.

7. The apparatus of claim 1, wherein the magnitudes of the plurality of distances are defined by an exponential function.

8. The apparatus of claim 1, wherein the magnitudes of the plurality of distances are defined by a sinusoidal function.

9. A method for displaying information, comprising the steps of:
    displaying a plurality of lines on a display, wherein each line represents the same value of information and the plurality of lines has a variable line resolution;
    positioning a value indicator within the plurality of lines on the display, wherein the value indicator designates a value of information of each of the plurality of lines; and
    varying one or more of the distances between the plurality of lines on the display.

10. The method of claim 9, further comprising the step of designating an area of interest within the plurality of lines, wherein the area of interest includes the location of a value indicator plus a local distance.

11. The method of claim 10, further comprising the step of expanding the variable line resolution within the area of interest on the display such that the variable line resolution is greater within the area of interest and less outside the area of interest.

12. The method of claim 10, further comprising the step of varying the variable line resolution using at least one of a piecewise linear algorithm, and exponential function, or a continuous compression function.

13. The method of claim 10, further comprising the steps of:

displaying a datum of flight control information; and displaying a flight path marker and the value indicator relative to the flight path marker in the area of interest on the display, wherein the value indicator is a pitch indicator.

14. A Heads-Down Display system for viewing information, comprising:

means for calculating the information to be displayed on a display means; and display means for viewing the information, including:

a plurality of lines displayed on the display means, wherein each line corresponds to the same value of information and the plurality of lines has a variable line resolution; and an area of interest surrounding a value indicator within the plurality of lines on the display means, wherein the area of interest includes the location of the value indicator plus a local distance, and the distances between the plurality of lines is grater in the area of interest than elsewhere on the display.

15. The system of claim 14, wherein the variable line resolution near the value indicator is greater than the variable line resolution further removed from the value indicator.

16. The system of claim 15, wherein the value indicator is a pitch indicator, and the system further comprises a flight path marker configured to move within the area of interest relative to the pitch indicator.

* * * * *